United States Patent

[11] 3,597,910

| [72] | Inventor | David N. Stewart |
| | | Box 111, Erskine, Alberta, Canada |
| [21] | Appl. No. | 855,159 |
| [22] | Filed | Sept. 3, 1969 |
| [45] | Patented | Aug. 10, 1971 |
| [32] | Priority | Mar. 14, 1969 |
| [33] | | Canada |
| [31] | | 045-768 |

[54] RESILIENT RAKE TOOTH
3 Claims, 4 Drawing Figs.

[52] U.S. Cl. ..................................................... 56/400, 56/377
[51] Int. Cl. ............................................. A01d 77/00
[50] Field of Search ........................................... 56/400, 364, 365, 366, 367, 370, 372, 376, 377, 29; 171/17

[56] References Cited
UNITED STATES PATENTS

| 2,472,260 | 6/1949 | Morrill | 56/377 |
| 2,486,766 | 11/1949 | Stenzel | 56/377 |
| 2,492,600 | 12/1949 | Stauffer | 56/29 X |
| 2,597,485 | 5/1952 | Hillyer | 56/29 X |
| 2,712,723 | 7/1955 | Ryan | 56/400 |
| 2,756,978 | 7/1956 | Wachsmith | 171/17 |
| 3,167,899 | 2/1965 | Best | 56/25.4 |
| 3,402,542 | 9/1968 | Johnston | 56/400 |

*Primary Examiner*—Russell R. Kinsey
*Attorney*—Lawrence I. Field

ABSTRACT: A resilient raking tooth having an elongated body formed from a plurality of twisted strands having the ends thereof secured from unrolling and an annular support for said tooth.

Patented Aug. 10, 1971

3,597,910

RESILIENT RAKE TOOTH

BACKGROUND OF THE INVENTION

1. Field of the Invention

This invention relates to teeth for raking apparatus and particularly to a resilient tooth adapted for use in an apparatus for raking sticks, stones, heavy clods of earth and the like.

It is known to use resilient teeth in side delivery rakes, pickup reels for combines, swathers and similar devices for picking up cut and swathed grain or grass. It is the practice to construct such teeth of solid resilient metallic or plastic in elongated straight form. The teeth are capable of being bent during their operation and have sufficient elasticity to return to their normal straight form after being bent. However, if a stone or other rigid object is encountered during operation of the pickup apparatus, teeth constructed in this fashion will be bent beyond their elastic limit unless some means is provided to allow the tooth to pass over the stone or other rigid object without being bent. One such means is to mount the tooth in a resilient mounting which is sufficiently rigid to secure the one end of the tooth and allow it to bend normally during pickup of grain or grass and which will allow the tooth to move at the mounting under severe impact of a stone or other rigid object and thereby avoid the tooth being bent or broken.

One of the problems in clearing land ready for cultivation, is that the land must be raked or picked over after large trees and boulders have been removed so that portions of roots, clods of earth and stones that would cause damage to land cultivation machinery, may be removed. Heretofore, it has been the practice to perform this operation manually and it will be obvious that a considerable amount of time, effort and expense is involved in such manual operation.

2. Description of the Prior Art

Numerous attempts have been made to develop some form of apparatus to perform this operation, but to date none have been entirely satisfactory. Among such prior apparatus have been large devices that take in large quantities of earth including sticks, stones and clods of earth and which pass the earth and other material through a series of screens which trap the sticks, stones and clods of earth and then discharge such unwanted material at periodic intervals. While such machines will perform the operation satisfactorily, they are very large, expensive and because of the large number of operating parts, require frequent and costly maintenance.

Other types of raking apparatus have been developed, but these suffer from the disadvantage that the rake teeth must be of large diameter and of considerable strength to rake out sticks, stones and clods of earth and, as a result, do not have the desirable feature of resiliency in the tooth to perform the raking function satisfactorily and avoid breakage if a large immovable object is encountered.

Attempts to mount such teeth in a resilient mounting such as is used in conventional machinery, have not been satisfactory owing to the large size of the teeth involved and to the large bending and impact forces encountered.

Further, the necessary increase in diameter of teeth in solid form for an operation of this nature, is such that the weight and cost of the teeth becomes a significant factor. The development of a raking device for sticks, stones and clods of earth along the lines of and in accordance with the teaching of conventional raking devices and resilient teeth has, therefore, been uneconomical and impractical.

SUMMARY OF THE INVENTION

The present invention provides a new form of resilient raking tooth including an elongated body member formed from twisted strands preferably metallic, to form a "rope cable." The ends of the elongated body member are welded or secured by means of a sleeve or cap. One end of the tooth is fixed rigidly in a raking device as, for example, a pickup drum or side delivery rake wheel and in operation, the tooth possesses the necessary strength and elasticity to dislodge sticks, stones and clods of earth and to deliver such material into a windrow or other collecting point. The tooth is sufficiently resilient to bend as required during penetration of the surface of the ground to dislodge the sticks, stones or clods of earth and to return to the normal straight form as it leaves the ground surface. In addition, the tooth will bend if a large immovable object is encountered during use, pass over the large immovable object without breaking, and return to the normal desired straight form as the object is passed.

The tooth is normally mounted so that one end is held rigidly while the opposite end is used to perform the raking function. The tooth may be so constructed that when the end being used for raking is worn, the tooth may be reversed so that the worn end will be held rigidly and the opposite end of the tooth used for raking. This provides a considerable improvement over conventional raking devices, wherein the teeth are constructed with one end adapted to be secured while the opposite end is used for raking and when the raking end of such a tooth is worn, there is no means provided to reverse the tooth and the entire tooth must be replaced. The present tooth may be constructed with a variety of ends as, for example, spiked, sleeved or welded, to aid in the raking performance of the tooth when used over different surfaces. For example, the spiked end may be used when raking hard ground where penetration is desired, the sleeved end may be used if the raking action is over soft ground and a welded blunt end may be used if heavy roots, logs, rocks, etc. are being raked.

While the primary purpose of the improved raking tooth is for use in a device for raking logs, roots, rocks and clods of earth, it will be obvious that the tooth could be constructed in the same form, of small diameter, and would be completely satisfactory for conventional side delivery rakes for raking grass or grain or in combine pickups for picking up swathed crops and the like.

DESCRIPTION OF THE PREFERRED EMBODIMENTS

Figure 1:
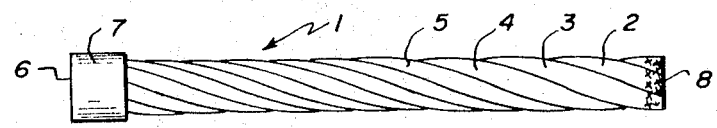
FIG. 1 is a plan view of a rake tooth constructed in accordance with the invention with the ends finished in alternate forms.

Reference to FIG. 1 will illustrate the improved rake tooth indicated generally at 1 and formed from a plurality of strands 2, 3, 4 and 5 of resilient material, twisted together to form a resilient rope cable. In the preferred embodiment illustrated the strands 2, 3, 4 and 5 are either solid or constructed in cable form of a plurality of strands from high-grade steel having the necessary strength and resilience to enable the construction of a tooth in the form illustrated with the desired strength and resilience. For example, a tooth suitable for raking heavy roots, logs, stumps and rocks which would be considered heavy work, would be constructed of sufficient individual strands to be of approximately 1 ⅝ inches in diameter and when constructed of improved plow steel in a length of 16 inches would have an approximate breaking strength of 120 tons with a bending pressure of approximately 6 tons.

While the diameter of a tooth constructed in this fashion would naturally vary, depending on the material from which it was constructed, it has been found that when using individual strands of improved plow steel, a cable of from ¼ to ⅞ inches is suitable for light work, that is to say, raking of hay, grass, leaves or the like while a cable of from ⅞ to 1 ⅜ inches is suitable for medium raking of trash, light roots, etc. and a cable of from 1 ⅜ to 2 ¾ inches is suitable for heavy work such as raking heavy roots, stumps, logs, rocks and the like.

Figure 2:
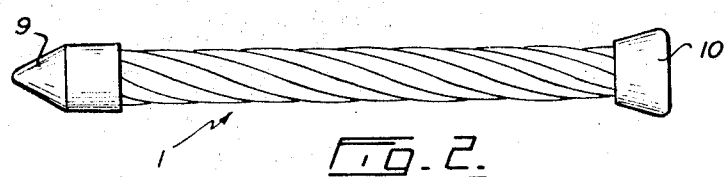
FIG. 2 is another plan view of a rake tooth with the ends thereof finished in additional alternate forms.

As seen in FIG. 1 in the drawings, the one end 6 of the tooth has a sleeve 7 fitted over the end and securely welded thereto while the end 8 of the tooth is merely welded together to prevent unraveling of the individual strands. In the embodiment illustrated in FIG. 2, one end of the tooth is formed with a spike or pointed end 9 securely welded to the end of the tooth while the opposite end is formed with a blunt cap 10 again securely welded to the tooth end. It has been found that the spike or tapered end 9 improves the operation of the tooth when used in hard ground requiring some penetration while the sleeved end 7 and the blunt end 10 are useful in soft ground and in light raking operations. The welded blunt end 8 has been found of particular use when the tooth is used for raking heavy roots, logs, rocks and the like.

Figure 3:
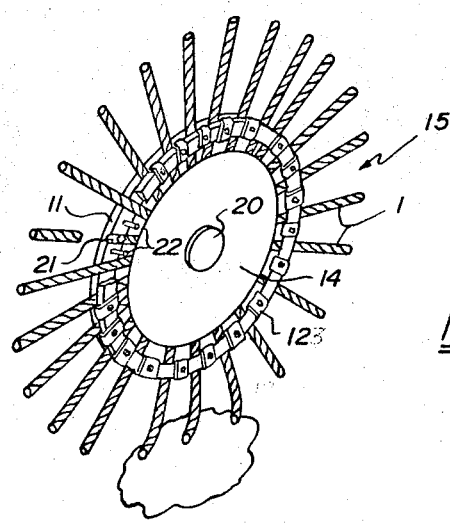
FIG. 3 is a perspective view showing a plurality of teeth counted on a rake wheel with some of the teeth bent while in contact with a rock, and partly broken away to illustrate the mounting.

Reference to FIG. 3 will illustrate the improved rake teeth connected to a rake wheel indicated generally at 15. The rake wheel includes an annular cradle or annular support 11 which is adapted to be rotatably mounted at 20. The cradle 11 includes a plurality of spaced depressions 21 with fastening bolts 22 projecting from the cradle 11 on each side of a depression 21. A tooth 1 is fitted in each depression in the cradle 11 to project radially from the cradle and is secured in position in the cradle by an annular clamping ring 12 which rests against the teeth and is secured by brackets 23 fitted over the bolts 22 and secured by nuts 24. A dished hub cap 14 is provided at the center of the rake wheel to deflect material and prevent material being caught in the center of the wheel.

Figure 4:
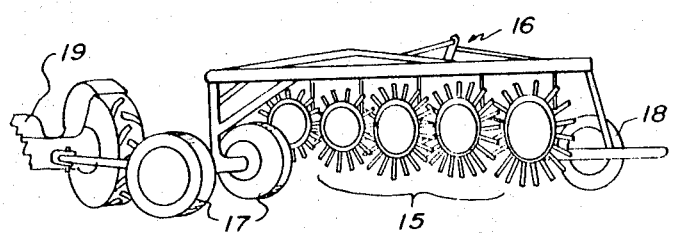
FIG. 4 is a perspective view showing a side delivery rake device including a plurality of rake wheels incorporating the improved rake teeth.

As seen in FIG. 4, a plurality of rake wheels 15 are mounted rotatably in a framework 16. The framework 16 includes front and rear aligned wheels 17 and 18 with the front wheels 17 steerable and adapted for connection to a tractor or other hauling device 19. As is customary in side delivery rakes, the plurality of rake wheels 15 are mounted at an angle to the line of forward travel of the device so that material raked by the wheels 15 will be forced into a windrow as the device is drawn forwardly.

When the raking device is not in operation or when it is being transported from one location to another, it will be obvious that the rake wheels 15 must be raised so that the teeth will not be in contact with the surface over which the device is traveling. In the device illustrated, this is accomplished through a system of cables connected to each raking wheel and traveling over pulleys to a central hydraulic lifting mechanism that may be actuated from the tractor 19 to raise the wheels or to release the wheels so that their weight will cause them to drop down into contact with the ground. Obviously, numerous mechanism could be employed for the purpose of raising and lowering the rake wheels 15, the cable and hydraulic system described being only one practical method.

While, in the embodiment illustrated, the rake teeth are secured in a rake wheel through a cradle member and clamping member, it will be obvious that other mechanisms could be employed for this purpose. For example, a rake wheel including a plurality of sockets formed radially in the wheel from the periphery thereof, could receive the ends of the rake teeth with some simple lock screw mechanism that would bear against the teeth when in the sockets to hold the teeth in place.

Again, while there has been illustrated, and described only the use of the rake teeth with a rake wheel, it will be obvious that the teeth could be utilized with an elongated cylindrical drum with mechanism for locking the teeth in the drum so they would project radially from the surface of the drum and could be used as pickup teeth in a manner similar to teeth used in a conventional pickup drum of a combine or similar agricultural implement.

I claim:

1. A raking apparatus comprising in combination:
   an annular tooth support adapted to be mounted rotatably and having a plurality of depressions each adapted to support a tooth therein;
   a tooth disposed in each of said depressions;
   an annular clamping ring secured to said support and serving to clamp said teeth in said depressions;
   and means securing said clamp ring to said annular support to lock said teeth in said support;
   each said tooth comprising an elongated body member formed from strands of resilient material twisted together to form a cable and means binding together the ends of the body member to prevent the twisted strands from unraveling 2. The tooth of claim 1 wherein the means binding the ends of the strands of cable together include a cap secured to one end of the body member.

3. A side delivery raking apparatus comprising in combination:
   a framework having front and rear supporting wheels,
   a plurality of raking apparatus as claimed in claim 1, mounted rotatably in the framework in overlapping spaced relationship and at an acute angle to the normal line of travel of the framework, and means for raising and lowering the raking apparatus relative to the framework.